US012627165B2

(12) United States Patent
Howlett, III et al.

(10) Patent No.: US 12,627,165 B2
(45) Date of Patent: May 12, 2026

(54) SYSTEMS AND METHODS FOR BATTERY CHARGING USING A NEGOTIABLE POWER SUPPLY

(71) Applicant: Iontra Inc, Centennial, CO (US)

(72) Inventors: John Richard Howlett, III, Centennial, CO (US); David Kessner, Denver, CO (US)

(73) Assignee: Iontra Inc, Centennial, CO (US)

( * ) Notice: Subject to any disclaimer, the term of this patent is extended or adjusted under 35 U.S.C. 154(b) by 804 days.

(21) Appl. No.: 17/970,175

(22) Filed: Oct. 20, 2022

(65) Prior Publication Data

US 2023/0037930 A1     Feb. 9, 2023

Related U.S. Application Data

(63) Continuation-in-part of application No. 17/566,535, filed on Dec. 30, 2021.

(Continued)

(51) Int. Cl.
*H02J 7/00*          (2006.01)

(52) U.S. Cl.
CPC ...... *H02J 7/00714* (2020.01); *H02J 7/00036* (2020.01); *H02J 7/0047* (2013.01); *H02J 7/007182* (2020.01)

(58) Field of Classification Search
CPC ............. H02J 7/00714; H02J 7/007182; H02J 7/00036; H02J 7/0047

(Continued)

(56) References Cited

U.S. PATENT DOCUMENTS

| | | | | |
|---|---|---|---|---|
| 8,773,092 B2 * | 7/2014 | Fishelov | ............. | H02M 3/1582 323/225 |
| 8,907,631 B1 | 12/2014 | Gurries et al. | | |

(Continued)

FOREIGN PATENT DOCUMENTS

| | | | | | |
|---|---|---|---|---|---|
| CN | 115699504 A | * | 2/2023 | ............ | H02J 7/0047 |
| CN | 116566201 A | * | 8/2023 | ............ | H02M 3/157 |

(Continued)

OTHER PUBLICATIONS

International Searching Authority, International Search Report and Written Opinion, issued for International Application No. PCT/US2021/065776, mailed Apr. 25, 2022.

(Continued)

*Primary Examiner* — Suresh Memula
(74) *Attorney, Agent, or Firm* — Derek Donahoe; Polsinelli PC

(57) ABSTRACT

Methods and systems for charging a battery utilizing a negotiable power supply in which the power supply and a component of a charge circuit negotiate a level of power are disclosed. A charge circuit may include a controller to communicate with the negotiable power supply to request a power signal comprising a voltage and a maximum current, which may then be provided by the negotiable power supply. A voltage value and/or maximum current value of the negotiated power signal may be provided as parameters to a model of one or more components of a charge signal shaping circuit. The circuit model may utilize the provided power parameters when modeling one or more charge circuit components to generate an accurate model of the charge circuit and used to control a charge circuit to provide power to recharge the battery that limits a power level that may damage the battery during charging.

23 Claims, 8 Drawing Sheets

Related U.S. Application Data

(60) Provisional application No. 63/270,427, filed on Oct. 21, 2021, provisional application No. 63/132,250, filed on Dec. 30, 2020.

(58) Field of Classification Search
USPC ........................................................ 320/162
See application file for complete search history.

(56) References Cited

U.S. PATENT DOCUMENTS

| | | | | |
|---|---|---|---|---|
| 9,153,991 | B2 * | 10/2015 | Chaturvedi | ......... H01M 10/443 |
| 9,912,181 | B2 * | 3/2018 | Gurries | ............. H02J 7/007192 |
| 10,148,108 | B2 * | 12/2018 | Nguyen | .............. H02J 7/00712 |
| 10,644,598 | B1 | 5/2020 | Lewinski Komincz et al. | |
| 11,708,005 | B2 | 7/2023 | Nguyen et al. | |
| 2003/0038612 | A1 | 2/2003 | Kutkut | |
| 2008/0239772 | A1 | 10/2008 | Oraw et al. | |
| 2013/0024034 | A1 | 1/2013 | Iino et al. | |
| 2013/0054041 | A1 * | 2/2013 | Fishelov | ............. H02M 3/1582 |
| | | | | 700/291 |
| 2014/0312828 | A1 | 10/2014 | Vo et al. | |
| 2016/0013719 | A1 | 1/2016 | Babazadeh et al. | |
| 2016/0090001 | A1 | 3/2016 | Nomoto | |
| 2018/0375342 | A1 | 12/2018 | Sultenfuss et al. | |
| 2019/0120910 | A1 | 4/2019 | Ghantous et al. | |
| 2022/0029443 | A1 * | 1/2022 | Konopka | .............. H02J 7/0068 |
| 2023/0042872 | A1 | 2/2023 | Sun | |
| 2023/0099305 | A1 * | 3/2023 | Howlett, III | ........... B60L 58/16 |
| | | | | 307/9.1 |
| 2023/0268770 | A1 | 8/2023 | Howlett, III et al. | |
| 2024/0039061 | A1 * | 2/2024 | Howlett, III | ...... H01M 10/4257 |

FOREIGN PATENT DOCUMENTS

| | | | | |
|---|---|---|---|---|
| CN | 118363831 | A | 7/2024 | |
| CN | 118369831 | A * | 7/2024 | |
| EP | 3350901 | B1 * | 5/2023 | ............... H02J 7/02 |
| JP | 2002354786 | A | 12/2002 | |
| JP | 2010226606 | A | 10/2010 | |
| JP | 2011024395 | A | 2/2011 | |
| JP | 2014060863 | A | 4/2014 | |
| KR | 101525941 | B1 * | 6/2015 | ............. H02J 7/342 |
| WO | 2021114875 | A1 | 6/2021 | |
| WO | WO-2022026934 | A1 * | 2/2022 | ........... H01M 10/44 |

OTHER PUBLICATIONS

International Searching Authority, International Search Report & Written Opinion, issued in connection with International Application No. PCT/US2022/047280, mailed Mar. 21, 2023 (9 pages).

Castaldo, A., Switching Regulator Fundamentals, Texas instruments, SNVA559C, Sep. 2012, Revised Feb. 2019.

* cited by examiner

500

502 — DETERMINE TARGET SHAPE OF CHARGE SIGNAL FOR CHARGING BATTERY CELL

504 — APPLY TARGET CHARGE SIGNAL TO CIRCUIT MODEL

506 — RECEIVE EXPECTED CHARGE SIGNAL AT BATTERY CELL FROM CIRCUIT MODEL

508 — GENERATE CONTROL SIGNALS TO CHARGE CIRCUIT COMPONENTS TO GENERATE TARGET CHARGE SIGNAL

510 — RECEIVE FEEDBACK FROM BATTERY MEASUREMENT CIRCUIT

512 — IS CHARGE SIGNAL AT BATTERY DIFFERENT THAN TARGET CHARGE SIGNAL?

N

Y

514 — ADJUST CONTROL SIGNALS TO CHARGE CIRCUIT COMPONENTS BASED ON FEEDBACK

FIG. 5

SYSTEMS AND METHODS FOR BATTERY CHARGING USING A NEGOTIABLE POWER SUPPLY

CROSS-REFERENCE TO RELATED APPLICATIONS

This application is related to and claims priority under 35 U.S.C. § 119(e) from U.S. Provisional Patent Application No. 63/270,427, filed Oct. 21, 2021, entitled "Systems and Methods for Battery Charging Using a Negotiable Power Supply," the entire contents of which is fully incorporated by reference herein.

This application is also a continuation-in-part and claims priority to U.S. Nonprovisional patent application Ser. No. 17/566,535, filed Dec. 30, 2021, entitled "Systems and Methods for Battery Charging Using Circuit Modeling," which claims benefit of priority under 35 U.S.C. § 119(e) from U.S. Provisional Application No. 63/132,250, filed Dec. 30, 2020, entitled "Systems and Methods for Battery Cell Charging Using Circuit Modeling," both of which are hereby incorporated by reference herein.

TECHNICAL FIELD

Embodiments of the present invention generally relate to systems and methods for charging of one or more batteries involving a negotiable power supply and the use of a tuned charging signal to charge the one or more batteries.

Background and Introduction

Many electrically powered devices, such as power tools, vacuums, any number of different portable electronic devices including mobile phones, tablets, watches and the like use rechargeable batteries as a source of operating power. Rechargeable batteries are limited by finite battery capacity and must be recharged upon depletion. Recharging a battery may be inconvenient as the powered device must often be stationary during the time required for recharging the battery. As such, significant effort has been put into developing charging technology that reduces the time needed to recharge the battery.

Battery systems also tend to degrade over time based on the charge and discharge cycling of the battery system, the depth of discharge and overcharging, among other possible factors. Thus, like the speed of charging, efforts are made to optimize charging to maximize battery life, not overdischarge the battery or overcharge the battery while using as much of the battery capacity as possible. Often these objectives are at odds, and charging systems are designed to optimize some attributes at the expense of others.

In some charging scenarios, pulse charging has been explored. However, it has been discovered that applying a square-wave pulse charge signal to charge a battery may degrade the life of the battery or may introduce inefficiencies in the charging of the battery. For example, the abrupt application of charge current (e.g., the sharp leading edge of a square-wave pulse) to the electrode (typically the anode) of the battery may cause a large initial impedance across the battery terminals resulting in a loss of transfer of power to the battery, lessening the efficiency of the charging process and/or damaging portions of the battery under charge, among other problems.

Rapid changes in the charge signal experienced from square pulses to the battery may introduce noise comprised of high-frequency harmonics, such as at the sharp leading edge of the square-wave pulse and during use of conventional reverse pulse schemes. Such high harmonics result in a large impedance at the battery electrodes. This high impedance may result in many inefficiencies and degradation of the battery, including capacity losses, heat generation, and imbalance in electro-kinetic activity throughout the battery, undesirable electro-chemical response at the charge boundary, and degradation to the materials within the battery that may damage the battery and degrade the life of the battery. Further, cold starting a battery with a sharp bonding edge pulse introduces limited faradaic activity as capacitive charging and diffusive processes set in. During this time, proximal lithium will react and be quickly consumed, leaving a period of unwanted side reactions and diffusion-limited conditions which negatively impact the health of the cell and its components. These and other inefficiencies are particularly detrimental during a fast recharging of the battery 104 where relatively higher currents are often involved.

It is with these observations in mind, among others, that aspects of the present disclosure were conceived and developed.

SUMMARY

One aspect of the present disclosure relates to a method of charging an electrochemical device. The method may include the operations of providing at least one characteristic of a negotiated power signal as an input parameter to a model of a charging circuit, inputting a target charge waveform to the model of the charging circuit to determine an estimated charge waveform generated by the charging circuit, and controlling, based on the estimated charge waveform, a switching device of the charging circuit.

Another aspect of the present disclosure relates to a system for charging an electrochemical device comprising a negotiable power supply controller in communication with a negotiable power supply and a controller. The controller may be configured to receive, from the negotiable power supply controller, at least one characteristic of a negotiated power signal as an input parameter to a model of a charging circuit, input a target charge waveform to the model of the charging circuit to determine an estimated charge waveform generated by the charging circuit, and control, based on the estimated charge waveform, a switching device of the charging circuit.

Yet another aspect of the present disclosure relates to a method of charging an electrochemical device comprising inputting characteristics of a charge signal from a negotiated power supply to a model of a charge circuit, the model of the charge circuit defining a shaped charge signal for charging the electrochemical device based on the characteristics of the charge signal from the negotiated power supply.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

FIG. 5 is a flowchart illustrating a method for utilizing a circuit model to determine a charge signal for charging a battery in accordance with one embodiment.

DETAILED DESCRIPTION

Figure 1:
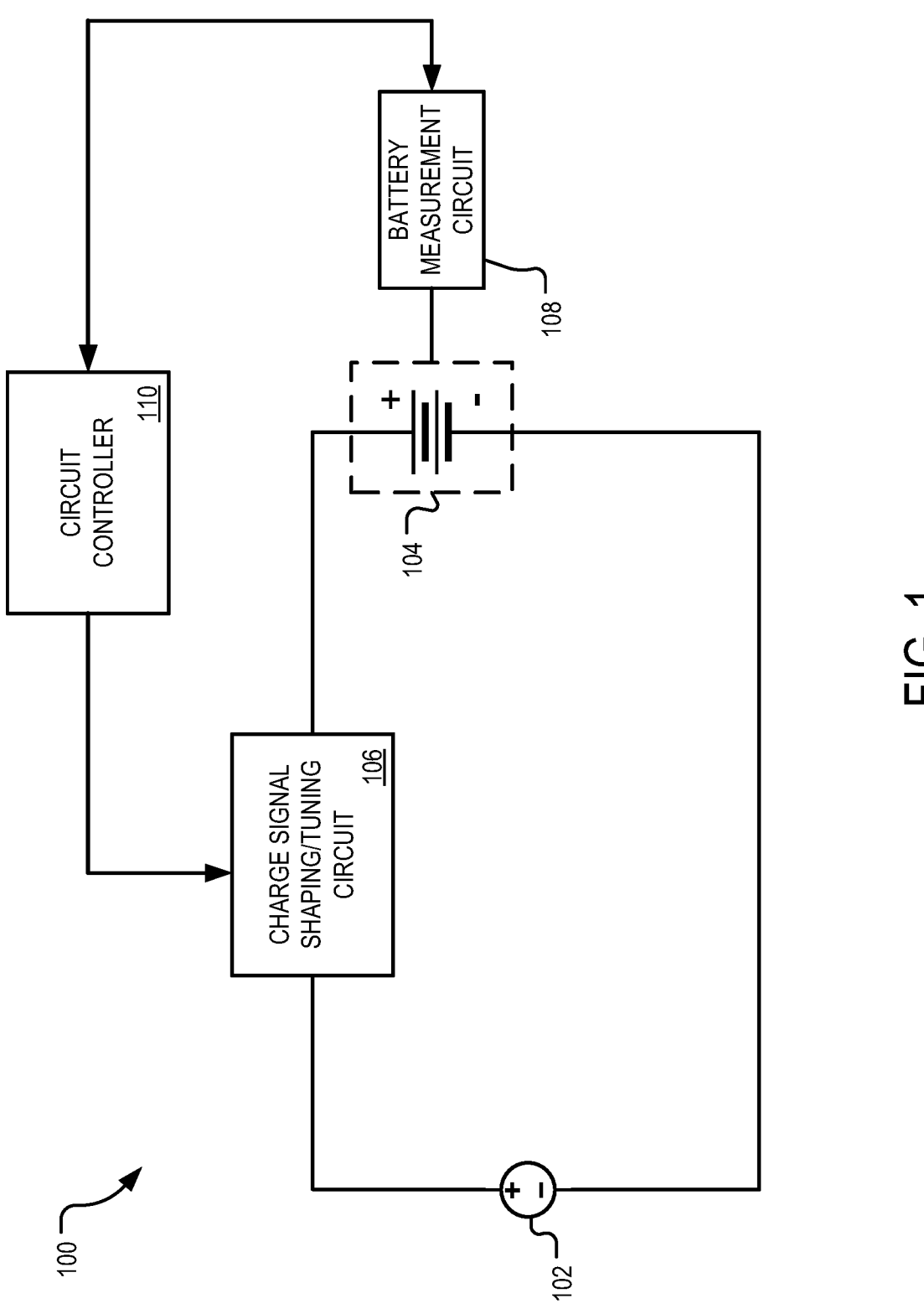
FIG. 1 is a schematic diagram illustrating a circuit for charging a battery utilizing a charge signal shaping circuit in accordance with one embodiment.

Systems, circuits, and methods are disclosed herein for charging (recharging) one or more batteries. The terms charging and recharging are used synonymously herein. Aspects of the present disclosure may provide several advantages, alone or in combination, relative to conventional charging. For example, through the systems, circuits, and methods discussed, less energy may be required to charge a battery than through other conventional charging circuits and methods. In another example, the charging techniques described herein may reduce the rate at which an electrode (anode and/or cathode) is damaged or otherwise degraded as compared to conventional charge and discharge cycles, may reduce heat generated during charging, which may have several follow-on effects such as reducing electrode and cell damage, reducing fire or short circuit risks, and the like. In other examples, the charging techniques described herein may allow for higher charging rates to be applied to a battery and may thus allow for relatively faster charging as compared to other techniques, particularly when considered in conjunction with other advantages. The techniques may more generally optimize charge rates to be used, which optimization may consider charge rate as well as other issues such as cycle life and temperature. In one example, charge rates and parameters may be optimized to provide for a longer battery life and greater charging energy efficiency. In another example, in what might be considered "fast charging," the disclosed systems and methods provide an improved balance of charge rate and battery life, while producing less heat.

The term "battery" in the art and herein can be used in various ways and may refer to an individual cell having an anode and cathode separated by an electrolyte, solid or liquid, as well as a collection of such cells connected in various arrangements. A battery or battery cell is a form of electrochemical device. Batteries generally comprise repeating units of sources of a countercharge and electrode layers separated by an ionically conductive barrier, often a liquid or polymer membrane saturated with an electrolyte. These layers are made to be thin so multiple units can occupy the volume of a battery, increasing the available power of the battery with each stacked unit. Although many examples are discussed herein as applicable to a battery, it should be appreciated that the systems and methods described may apply to many different type of batteries ranging from an individual cell to batteries involving different possible inter-connections of cells such as cells coupled in parallel, series, and parallel and series. For example, the systems and methods discussed herein may apply to a battery pack comprising numerous cells arranged to provide a defined pack voltage, output current, and/or capacity. Moreover, the implementations discussed herein may apply to different types of electrochemical devices such as various different types of lithium batteries including but not limited to lithium-metal and lithium-ion batteries, lead acid batteries, various types of nickel batteries, and solid state batteries, to name a few. The various implementations discussed herein may also apply to different structural battery arrangements such as button or "coin" type batteries, cylindrical cells, pouch cells, and prismatic cells.

In one example, the various embodiments discussed herein charge a battery by generating a harmonically tuned charge signal using a model of one or more components of a charge signal tuning circuit. In particular, a charge signal tuning algorithm may provide, to a circuit model, an expected or intended charge signal for charging a battery. The model may, based on the intended charge signal, output one or more control signals to switches or other components of the charge signal tuning circuit based on a modeling of the components of the charge signal tuning circuit. In some instances, the tuned charge signal may correspond to a harmonic (or harmonics) associated with an optimal transfer of energy based on a real and/or an imaginary value of the energy transfer of the battery. In this manner, the control signals to the components of the charge signal tuning circuit shape or more generally tune a charge signal based on a model of the components of the circuit rather than or in addition to feedback of measurements of the charge signal at the battery during charging, such as voltage and current. In some instances, this approach may be referred to as a "feed-forward" technique. The feed-forward technique of utilizing a model of the circuit to determine the control signals for defining a charge signal may provide several advantages including accuracy and speed of signal adjust-ment. Moreover, the arrangement may be operable with fewer components than other approaches thereby reducing costs, using less PCB real estate, among other advantages. Additionally, even when using feedback, slower systems may be used as faster feedback may not be required.

Practically speaking, in some instances it may be insuf-ficient to rely solely on a model of a circuit without some type of feedback to adjust for model errors, periodically provide additional data to the model to alter its output, among other things. For example, during operation of the charge circuit, aspects of the battery under charge may change in response to the state of charge (SoC), state of health (SoH), and the like. Thus, in some instances, aspects of the battery may be obtained and used to adjust the model of the circuit or control of the switches of the charging circuit to fine tune the shape of the charge signal. In general, modeling of the circuit provides an estimation and prede-termination of charge signals to counter the relative slow feedback path from the battery sensors, particularly here where the presence of the model provides for techniques where less expensive slower feedback paths may be used. For example, the circuit model may be utilized to generate an initial shaped charge signal for the battery. However, the charge signal shape may be occasionally updated or adjusted based with feedback information based on measured or determined changes of the battery. In such instances, a very fast feedback path may be necessary as immediate real-time feedback may not be necessary. In some instances, such updates or changes in the circuit model and/or the shape of the charge signal may also provide an indication of a SoC and/or SoH of the battery being charged.

In another example, various embodiments discussed herein are suitable for charging a battery utilizing a negotiable power supply in which the power supply and a component of a charge circuit negotiate a level of power. In one implementation, the charge circuit may include a controller to communicate with the negotiable power supply to request a power signal comprising a voltage and a maximum current, which may then be provided by the negotiable power supply. A Universal Serial Bus Type-C (USB-C) is one type of negotiable power supply that may be used with the charge circuit embodiments described herein, although other negotiable power supply systems and associated connectors are also contemplated (e.g., SAE J1772-type connectors, other USB Power Delivery (PD) type connectors, etc.). The negotiated power components (e.g., a voltage value and maximum current value provided by the negotiated power supply) may be utilized by the charge circuit to charge a battery. For example, one or more switch devices of the charge circuit may be controlled to limit an overall power provided to the electrodes of the battery to prevent damaging the battery. In one particular implementation, the voltage value and/or maximum current value may be provided as parameters to a model of one or more components of a charge signal shaping circuit. The circuit model may utilize the provided power parameters when modeling the one or more charge circuit components to generate an accurate model of the operation of the charge circuit. For example, the circuit model may include an input voltage to the battery and model one or more control signals to switches of the charge circuit based on the input voltage. As the input voltage relates to the voltage value provided by the negotiable power supply, the voltage value may be an input parameter to the model. In another example, the circuit model may be used to control the charge circuit to provide power to recharge the battery. The circuit model may include limits to prevent the charge circuit from providing a power level that may damage the battery. As such, the model may receive a maximum current value as negotiated with the negotiable power supply. The maximum current value parameter may be utilized to calculate a maximum power available from the negotiable power supply for limiting or otherwise ensuring the battery does not receive a damaging amount of power. These and other advantages gained through the use of a negotiable power supply are discussed in more detail herein.

FIG. 1 is a schematic diagram illustrating an example circuit 100 for recharging a battery 104 utilizing a charge signal shaping circuit 106. In general, the circuit 100 may include a power source 102, which may be a voltage source, a current source, or a combination of voltage and current sources. In one particular embodiment, the power source 102 is a direct current (DC) voltage source, although alternating current (AC) sources are also contemplated. In various examples, the power source 102 may include a DC source providing a unidirectional current, an AC source providing a bidirectional current, or a power source providing a ripple current (such as an AC signal with a DC bias to cause the current to be unidirectional). In still other implementations discussed in more detail below, the power source 102 may be a negotiable power supply in which a voltage and maximum current from the power source may be negotiated between the power supply and one or more components of the charge circuit 100, such as circuit controller 110. In general, the power source 102 supplies the charge current that may be shaped and used to charge the battery 104. In one particular implementation, the circuit 100 of FIG. 1 may include a charge signal shaping circuit 106 to shape one or more aspects of a charge signal for use in charging the battery 104. In one example, a circuit controller 110 may provide one or more inputs to the power signal shaping circuit 106 to control the shaping of the charge signal. The inputs may be used by the shaping circuit 106 to alter a signal from the power source 102 into a more efficient power charging signal for the battery 104. The operation and composition of the charge signal shaping circuit 106 is described in more detail below.

In some instances, the charge signal shaping circuit 106 may alter energy from the power source 102 to generate a charge signal that is shaped based on charge conditions at the battery 104, such as a charge signal that at least partially corresponds to a harmonic or harmonics based on the impedance when a signal comprising the signal is applied to the battery 104. In one example, the circuit 100 may include a battery measurement circuit 108 connected to the battery 104 to measure battery voltage and/or charge current, as well as other battery attributes like temperature, and/or measure or calculate the impedance across the electrodes of the battery 104. In one example, battery characteristics may be measured based on the applied charge signal. In another example, battery characteristics may be measured as part of a routine that applies a signal with varying frequency attributes to generate a range of battery characteristic values associated with the different frequency attributes to characterize the battery, which may be done prior to charging, during charging, periodically during charging, and may be used in combination with look-up techniques, and other techniques. In one example, the system may include a look-up table that is generated based on testing of specific types of battery cells, and where the look-up table defines impedance values based on measured voltage and current values, which may also include phase offset information between the signal responses, from an applied charge signal with some known frequency attribute, whether a harmonic frequency profile of a leading edge of a charge pulse or otherwise. The table may also be organized also by temperature, SOC, or SOH. The battery 104 characteristics may vary based on many physical of chemical features of the battery, including a state of charge and/or a temperature of the battery. As such, the battery measurement circuit 108 may be controlled by the circuit controller 110 to determine various battery characteristic values during battery charging, among other times, and provide the measured and/or calculated battery values to the circuit controller 110.

Based on the battery characteristics, the circuit controller 110 may generate an intended charge signal for optimal battery charging 104. For example, impedance at a particular harmonic or harmonics may be used by the circuit controller 110 to define a charge signal that includes features of the particular harmonic or harmonics. As such, the circuit controller 110 may execute a charge signal algorithm that outputs a charge signal shape based on measured and/or modeling conditions of the battery 104. The circuit controller 110 may then generate one or more control signals based on the charge signal algorithm and provide those control signals to the charge signal shaping circuit 106. The control signals may, among other functions, shape the charge signal to approximate the shaped charge signal determined by the algorithm. The shaped charge signal will typically not conform to a traditional repeating charge signal, such as a repeating square wave or triangle wave charge signal.

Figure 2:
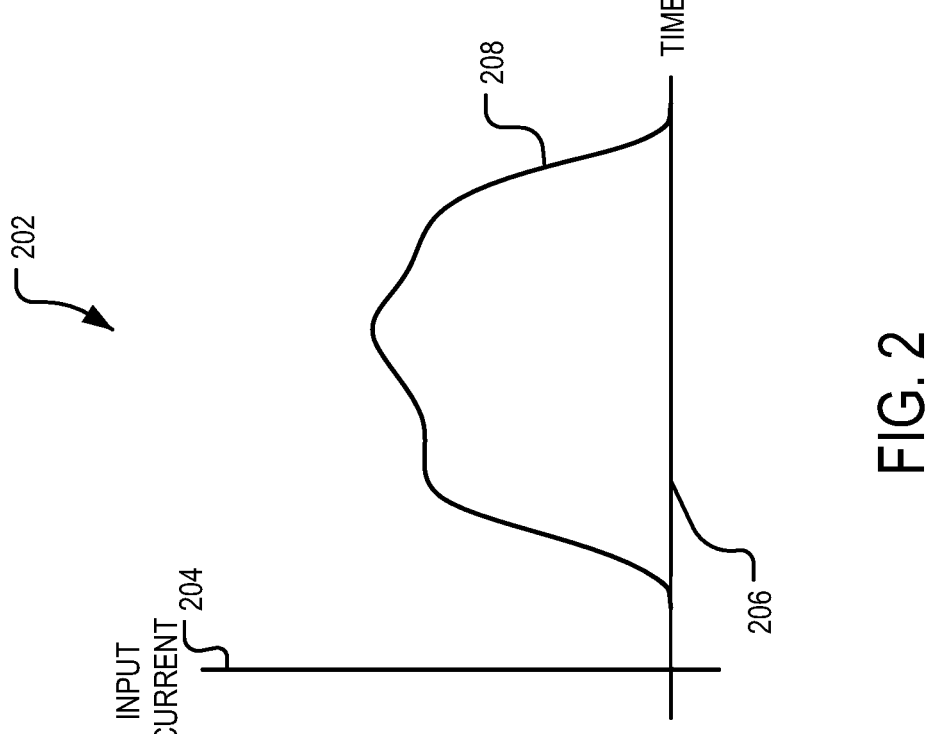
FIG. 2 is a signal graph of an example harmonically tuned charge waveform for charging a battery in accordance with one embodiment.

For example, FIG. 2 is a signal diagram 202 of a harmonically tuned battery charging signal 200 for charging a battery 104. The signal diagram 202 illustrates a charge signal 208 graphed as input current 204 versus time 206. The shape of the charge signal 208 may be determined by a charge signal algorithm or program executed by circuit controller 110. In one instance, the shape of the charge signal 208 may be based on characteristics of the battery 104, such as a correlation between impedance (real and/or imagining values thereof) and harmonic or frequency attributes of a signal applied to the battery, although other battery characteristics are contemplated. For example, the shape of some portion of the charge pulse 208 may correspond to a harmonic associated with the impedance value of the battery. In still another example, the charge signal 208 may correspond to a harmonic associated with one or both of a conductance or susceptance of an admittance of the battery 104. In other various embodiments, a charge signal for a battery cell may be altered to remove harmonics corresponding to a high impedance or conversely low admittance of the battery cell. As such, other measures may also be used, such as admittance or its components of susceptance and conductance with impedance being used in the discussed examples. The term impedance as used herein may include its inverse admittance. In general, the charge signal shaping algorithm of the circuit controller 110 may sculpt or otherwise determine the shape and/or tune the charge signal 208 based on any characteristics of the battery 104, either measured, modeled, or estimated. In the example of FIG. 2, the leading edge of the signal 208 may conform with a harmonic and the harmonic determined based on its impedance effect when applied to the battery for charge. The body of the signal may be comprised of various possible harmonics, which would be measurable upon application of various possible transforms, with the harmonic content of the body determined, at least in part, on the response impedance effect of one or more of the harmonics when applied during charge. The shape of the body may similarly contribute its own effect when applied to the battery. The width of the body may be on the order of microseconds but may also be significantly longer and range from milliseconds to seconds, or longer. The trailing edge of the charge signal may also conform to a harmonic. Various harmonic attributes of the charge signal may be defined alone or in various combinations.

Further, as the characteristics of the battery 104 may change due to state of charge, state of health, temperature, and other factors, the shape of the charge signal 208 may also be changed over time as the impedance response to the shape of the charge signal may change. The circuit controller 110 may therefore, in some instances, perform an iterative process of monitoring or determining characteristics of the battery 104 and adjust the shape of the charge signal 208 applied to the battery accordingly. In such a process, the model may be consulted, impedance at various frequencies computed and applied to the model or other shaping controller, among other things. This iterative process may improve the efficiency of the charge signal used to recharge the battery, thereby decreasing the time to recharge the battery, extending the life of the battery (e.g., the number of charge and discharge cycles it may experience), optimizing the amount of current charging the battery, and avoiding energy lost to various inefficiencies, among other advantages. One particular implementation of the charge shaping circuit 106 is further described in co-filed U.S. patent application Ser. No. 17/232,975 titled "Systems And Methods For Battery Charging" and filed on Apr. 16, 2021, the entirety of which is incorporated by reference herein.

Figure 3:
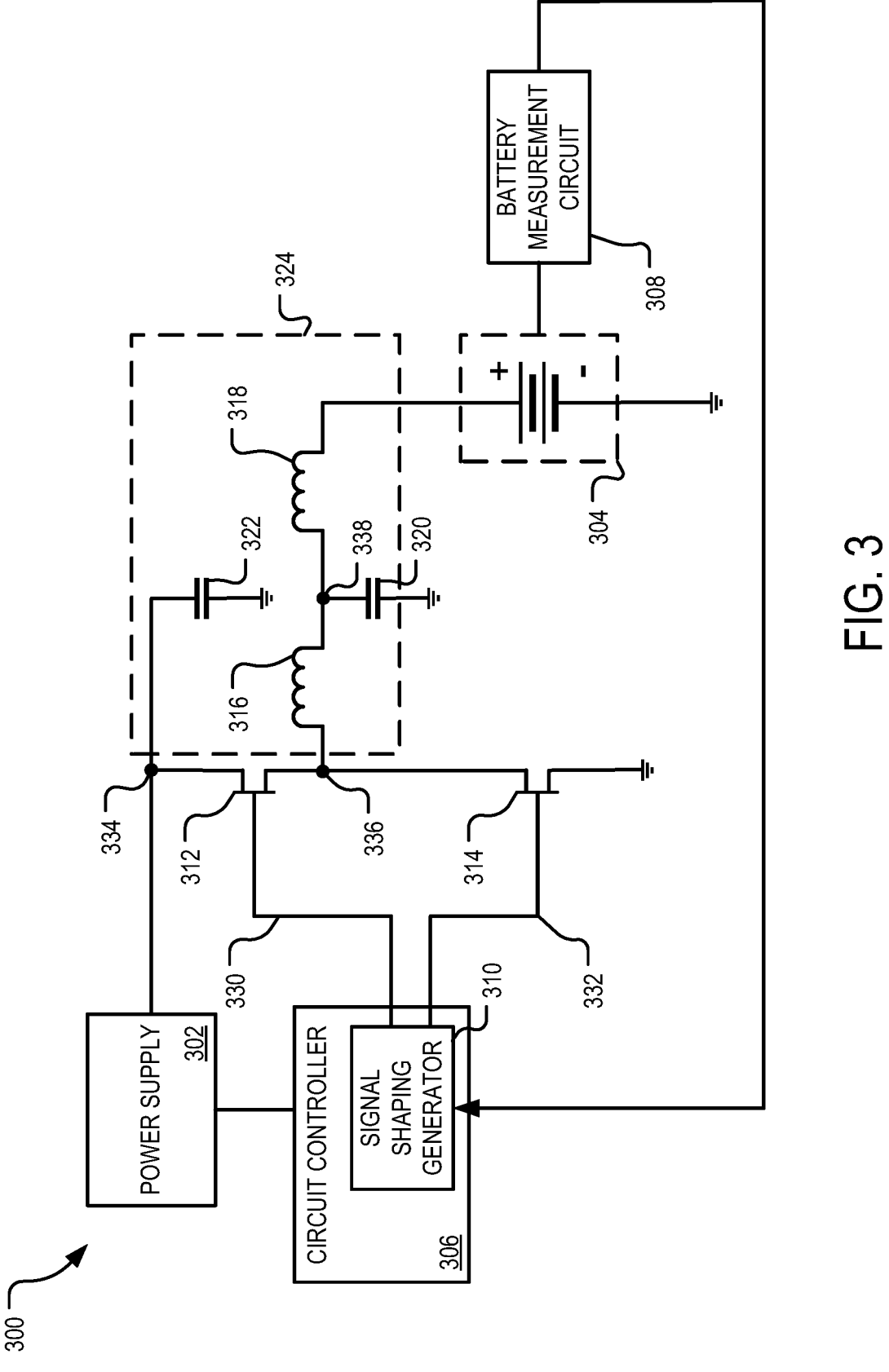
FIG. 3 is a schematic diagram illustrating a circuit for charging a battery utilizing switching elements to shape a charge signal in accordance with one embodiment.

FIG. 3 is a schematic diagram illustrating a circuit 300 for charging a battery 104 utilizing switching elements 312, 314 to shape a charge signal for charging the battery, in accordance with one embodiment. The circuit 300 includes elements described above with reference to charging circuit 100 of FIG. 1, including power supply 302, circuit controller 306, battery measurement circuit 308, and battery 304. Other elements illustrated in the circuit 300 of FIG. 3 may be included in charge signal shaping circuit 106 of FIG. 1. Thus, as explained in more detail below, the circuit controller 306 may provide one or more control signals 330, 332 to elements of the circuit 300 to shape a current or voltage signal from the power supply 302 to charge the battery 304. The circuit controller 306 may be implemented through a Field Programmable Gate Array (FPGA) device, a microcontroller, an Application-Specific Integrated Circuit (ASIC), or any other programmable processing device. In one implementation, the circuit controller 306 may include a charge signal shaping generator 310 to determine the shape of the charge signal to be applied to the battery 304. The charge signal shaping generator 310 of the circuit controller 306, in some instances, receive measurements of characteristics of the battery from the battery measurement circuit 308 for use in determining the shape of the charge signal. However, as explained in more detail below, such a feedback mechanism may occur at a rate that does not allow for effective shaping of the charge signal such that a model of one or more components of the circuit 300 may be utilized to determine the control signals 330, 332 for controlling the elements of the circuit 300 with or without a feedback mechanism.

As mentioned, the circuit 300 may include one or more components to shape a charge signal for charging a battery 304. In the particular implementation shown, the circuit 300 may include a first switching element, e.g., transistor 312, and a second switching element, e.g., transistor 314, connected in series to an output 334 of the power supply 302. The first transistor 312 may receive an input signal, such as pulse-width modulation (PWM) control signal 330, to operate the first transistor 312 as a switching device or component. In general, the first transistor 312 may be any type of transistor, e.g., a FET, or any type of controllable switching element for controllably connecting a first inductor 316 to the output 334 of the power supply 302. For example, the first transistor 312 may be a FET with a drain node connected to the first inductor 316, a source connected to the power supply 302, and a gate receiving the control signal 330 from the circuit controller. The control signal 330 may be provided by the circuit controller 306 to control the operation of the first transistor 312 as a switch that, when closed, connects the first inductor 316 to the power supply 302 such that the charge signal from the power supply flows through the first inductor 316. The second transistor 314 may receive a second input signal 332 and may also be connected to the drain of the first transistor 312 at node 336. In some instances, the second input signal 332 may be a PWM signal opposite of the first control signal 330 to the first transistor 312. Thus, when the first transistor 312 is closed to connect the first inductor 316 to the power supply 302, the second transistor 314 is open. When the first transistor 312 is open, conversely, the second transistor 314 is closed, connecting node 336 and the first inductor 316 to ground. Although the first control signal 330 and the second control signal 332 are described herein as opposing signals to control the transistors into opposing states, other techniques for controlling the switching elements 312, 314 may also be implemented with the circuit 300. In general, the PWM signals 330, 332 are configured such that the first transistor 312 and the second transistor 314 may be open at the same time, but are not closed at the same time. The inductor value, the capacitor value, the time and frequency of actuating the transistors, and other factors can be tailored to generate a waveform and particularly a waveform with controlled harmonics to the battery for charging the same.

In addition to the first inductor 316, other components may be included in the circuit 300, collectively referred to as a "filter" 324 portion of the circuit. In particular, the circuit 300 may include a first capacitor 322 connected between the output 334 of the power supply and ground. A second capacitor 320 may be connected between the first inductor 316 (at node 338) and ground. A second inductor 318 may be connected between node 338 and an anode of the battery 304. The filter 324 of the circuit 300 may operate, in general, to prevent rapid changes to the charge signal applied to the battery 304. For example, upon closing of the first transistor 312 based on control signal 330, first inductor 316 and second inductor 318 may prevent a rapid increase in current transmitted to the battery 304. Such rapid increase in current and/or voltage may damage the battery 304 or otherwise be detrimental to the life of the battery. Moreover, the inductor may shape the waveform applied to the battery, and control of the signal applied to the inductor may provide for controlled shaping of the waveform. In essence, when the transistor is turned on connecting the inductor to the rail 334, the voltage at the input to the inductor rises but the inductor, depending on the inductor value, causes the leading edge of the charge current transferal from the inductor to be shaped and not abrupt. Depending on the inductor value and signal applied to the inductor, the shape may be controlled by controlling application of current and voltage to the inductor. In another example, capacitor 320 may store energy from the power supply 302 while first transistor 312 is closed. Upon opening of the first transistor 312, the capacitor 320 may provide a stable voltage to the inductor 318 such that the inductor may provide a predictable current to the battery 304 and may similarly be used to controllably shape the waveform applied to the battery. Other advantages for charging of the battery 304 are also realized through filter circuit 324 but are not discussed herein for brevity.

It should be appreciated that more or fewer components may be included in charge circuit 300. For example, one or more of the components of the filter circuit 324 may be removed or altered as desired to a filer the charge signal to the battery 304. Many other types of components and/or configurations of components may also be included or associated with the charge circuit 300. Rather, the circuit 300 of FIG. 3 is but one example of a battery charging circuit 300 and the techniques described herein for utilizing a circuit model for generating or otherwise determining control signals 330, 332 for shaping a charge signal may apply to any number of battery charging circuits.

As described above, the signal shaping generator 310 of the circuit controller 306 may control the shape of the charge signal based on feedback measurements of the battery 304 received from the battery measurement circuit 308. For example, an initial charge signal may be applied to the battery 304 and one or more measurements of the battery 304 (such as a current into battery or a voltage across the battery) may be obtained by the battery measurement circuit 308. These measurements may be provided to the signal shaping generator 310 which may, in turn, determine an error between an expected measurement of the battery characteristic and a measured value at the battery 304. Based on this determined error, the signal shaping generator 310 may control, via control signals 330, 332, the first transistor 312 and the second transistor 314 to adjust the shape of the charge signal to the battery 304. In other words, the signal shaping generator 310 may sculpt the charge signal transmitted to the battery 304 to generate an expected measured characteristic of the battery 304. As long as the feedback measurements are expected, the shape of the charge signal may be maintained by the signal shaping generator 310 via the control signals 330, 332. A detected difference between an expected measurement and a measured value, however, may cause the circuit controller 306 to alter the shape of the charge signal to bring the battery 304 response into an expected range of values. For example, the circuit controller 306 may alter the shape of the charge signal based on an expected real impedance value or other characteristic of the battery. Some particular implementations for obtaining characteristic measurements of the battery are described in greater detail in co-filed U.S. Nonprovisional patent application Ser. No. 17/327,416 titled "Systems And Methods For Impedance Measurement Of A Battery Cell" and filed on May 21, 2021, the entirety of which is incorporated by reference herein.

In many instances, the feedback techniques used by the signal shaping generator 310 to alter or shape a charge signal to a battery 304 may arrive too slowly to effectively shape a fast-occurring charge signal. For example, a charge signal 330, 332 may include harmonically shaped pulses occurring at a particular frequency, often at the same or faster rate than the battery measurement circuit 308 can obtain battery characteristic measurements and/or the circuit controller 306 can adjust the shape of the charge signal in response to the measured battery characteristics. As a result, a circuit controller 306 utilizing feedback measurements to adjust a shape of a charge signal may be challenged to fine-tune the charge signal for optimal battery charging, particularly at a high-frequency shaped charge signal.

Figure 4:
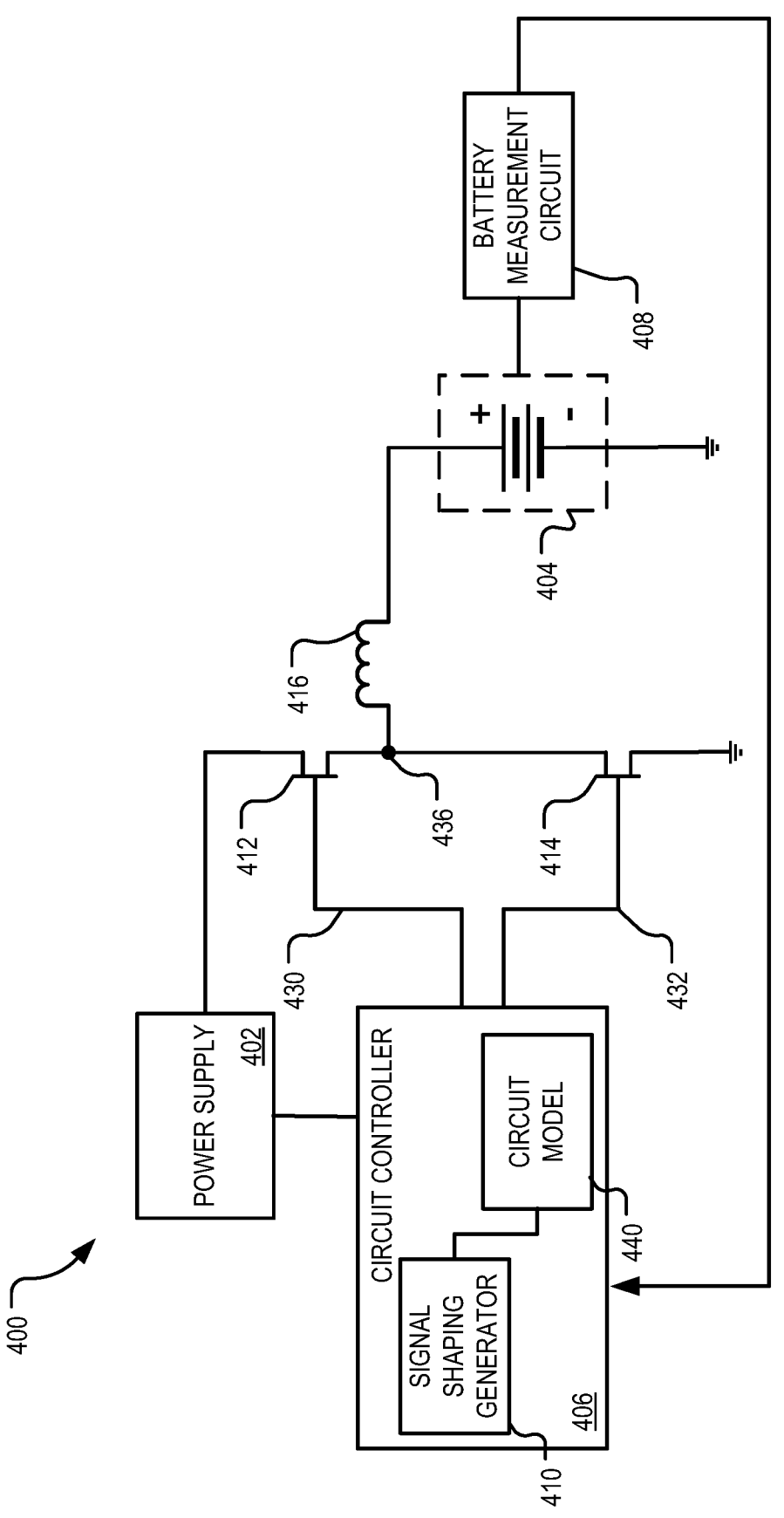
FIG. 4 is a schematic diagram illustrating a circuit for charging a battery utilizing a circuit model in accordance with one embodiment.

FIG. 4 is a schematic diagram illustrating a circuit 400 for charging a battery 404 utilizing a circuit model 440 in accordance with one embodiment. The circuit 400 of FIG. 4 is a simplified version of the charge circuit 300 described above with reference to FIG. 3 and may include similar components, such as a power supply 402, a first transistor 412 or other type of electronic switch, a second transistor 414 or other type of electronic switch, battery 404 and circuit controller 406. Similar to above, the first transistor 412 may be controlled by a control or input signal 430 to operate the transistor as a switch and alternately connect an inductor 416 to an output of the power supply 402. In general, the first transistor 412 may be any type of FET transistor or any type of controllable switch device. The control signal 430 may be provided by the circuit controller 406 to control the operation of the first transistor 412 as a switch that, when closed, connects the inductor 416 to the power supply 402 such that the charge signal from the power supply flows through the inductor 416. A second transistor 414 may receive a second input signal 432 and may also be connected to the drain of the first transistor 412 at node 436. As above, the second input signal 432 may be a PWM signal opposite of the first control signal 430 to the first transistor 412 such that, when the first transistor 412 is closed to connect the inductor 416 to the power supply 402, the second transistor 414 is open. When the first transistor 412 is open, conversely, the second transistor 414 is closed, connecting node 436 and the inductor 416 to ground. The operations of the transistors 412, 414 is thus similar to the circuit described above. For example, the PWM signals 430, 432 are configured such that the first transistor 412 and the second transistor 414 may be opened at the same time, but not both closed at the same time.

As noted above, the circuit 400 of FIG. 4 is a simplified version of the circuit 300 of FIG. 3. In particular, many of the components of the filter portion of the charge circuit have been removed for clarity. Such components may or may not be included with charge circuit 400. Further, other components may also be included in the circuit 400 for providing a charge signal to the battery 404, although not shown in FIG. 4. Rather, the components of the circuit 400 are illustrated in FIG. 4 as a simplified charge circuit for use in discussing utilizing a circuit model 440 to generate or otherwise determine the control signals 430, 432 of the first transistor 412 and the second transistor 414.

As also discussed above, shaping a charge signal based on a feedback of battery 404 characteristics may occur slowly such that the initial effect on the target battery may be inefficient. Thus, the circuit 400 of FIG. 4 may utilize a model 440 of aspects of the charge circuit to estimate the charge signal at the output of the inductor 416 for application to the current collector of the battery 404. In some instances, the circuit model 440 may model the components external to the circuit controller 406, such as power supply 402, first transistor 412, second transistor 414, and inductor 416 to estimate a current waveform at the battery 404. Additional components, such as components of filter circuit 324, may also be included in the circuit model 440. In one particular implementation, the circuit model 440 may include a model of inductor 416, including an expected input voltage and/or current to the inductor and an estimated output voltage and/or current from the inductor. The components included in the model may have varying attributes to determine the effect of the component on an applied charge signal. For example, the inductor model may include an inductance and an equivalent series resistance value associated with the inductor 416. Other modeled components, such as the switches 412, 414 and/or the battery 404 may also include various attributes to improve the accuracy of a simulation performed on the modeled components. Further, the attributes of the modeled components may be adjusted over time based on performance data or feedback data from the circuit components. For example, the charge signal of the circuit 400 may be sampled and fed back to the circuit controller 406 and a comparison of the received charge signal to an expected charge signal may be made by the controller. Based on a difference, the circuit controller 406 may alter or adjust one or more attributes of the components of the model to improve the accuracy of the model. In addition, the controller 406 and/or the signal shaping generator 410 may adjust the control signals 430, 432 to the switching elements 412, 414 based on the feedback received from the battery measurement circuit 408. The adjustments to the model components and/or the control of the switching elements 412, 414 may be repeated over a period of time such that the adjustments may account for parasitic effects to the components.

Regardless of the components included in the circuit model 440, the model may input a target current or voltage charge signal from signal shaping generator 410 and determine the estimated charge signal received at the battery 404 based on the target charge signal and the modeled circuit. For example, assume the signal shaping generator 410 determines that the shape of the charge signal should be the arbitrary charge signal 208 of the signal graph 202 of FIG. 2. The signal shaping generator 410 may therefore provide the target shaped charge signal to the circuit model 440 as an input to the model. The circuit model 440 may apply the shaped charged signal to the modeled circuit to obtain the expected charge signal at the output of the inductor 416. The circuit controller 406 may utilize the output of the circuit model to control the first transistor 412 and second transistor 414 over the time period of the shaped charge signal 208 based on the circuit model output to determine the expected charge signal through the inductor 416 (or the expected charge signal received at battery 404). In some instances, the circuit model output may be utilized to generate an initial shaped charge signal to the battery 404, with more finetune control of the charge signal occurring after the initial charge signal and based on feedback received from the battery measurement circuit 408.

Through a comparison of the target charge signal output by the circuit model 440 to the feedback information received at the circuit controller 406, an error between the target charge signal and the received charge signal may be determined. In some instances, the signal shaping generator 410 may adjust the shape of the charge signal to compensate for the error as determined by a comparison of the target charge signal and the feedback information. By modeling the circuit performance and, in particular, the shape of the charge signal expected at the battery 404 based on an input charge signal and the modeled components of the charge circuit (such as the inductor 416), the circuit controller 406 may determine a difference between a target shape of a charge signal and an actual shape of the charge signal based on the feedback information.

In some instances, a difference between a target charge signal and an expected charge signal may be obtained without feedback. For example, a target charge signal may be generated by the signal shaping generator 410 and provided to the circuit model 440. The circuit model 440 may input the target charge signal and generate an expected charge signal that would result from application of the charge signal to the modeled circuit. A comparison of the target charge signal to the output of the circuit model 440 may generate the error discussed above, which the circuit controller 406 may utilize to alter parameters of the circuit model 440 and/or utilize to control components of the charge circuit 400, such as switching elements 412, 414. In this manner, the feedback mechanism of battery characteristics may be removed from the charge circuit and adjustments to the control of the components of the charge circuit 400 may be based on the modeled circuit performance instead. The circuit model 440 may therefore allow the circuit controller 406 to adjust the shape of the charge signal at a rate that exceeds the frequency at which measurements of the battery 404 may be obtained and processed by the battery measurement circuit 408. Modeling and feedback measurement may also be used in combination, such as in a slower feedback loop.

In one implementation, the signal shaping generator 410 may output control signals 430, 432 to control first transistor 412 and second transistor 414, respectively, based on the determined error of the charge signal. In other implementations, a charge circuit controlling mechanism of the circuit controller 406 may receive one or more inputs from the signal shaping generator 410 and generate the control signals 430, 432 for first transistor 412 and second transistor 414 to shape the charge signal according to the determined error. For example, the error may indicate that some aspect of the charge signal is different than the target charge signal. Based on the determined error, the circuit controller 406 may provide control signals 430, 432 to transistors 412, 414 to shape the charge signal, thereby compensating for the estimated error in the charge signal received at the battery 404.

In this manner, the circuit controller 406 may adjust the shape of a charge signal to a battery 404 based on an estimated charge signal from a model of the charge circuit and the measured feedback from the battery 404.

Use of the circuit model 440 a circuit model to determine a charge signal for charging a battery is illustrated in the method 500 illustrated in the flowchart of FIG. 5. The operations of the method 500 of FIG. 5 may be modules, programs, algorithms, components, etc. of the circuit controller 406 discussed above to shape a charge signal to charge a battery 404. In one instance, the circuit controller 406 may perform one or more of the operations to control the first transistor 412 and/or the second transistor 414 to shape the charge signal from a power supply 402 and apply the signal to charge the battery 404. In other instances, however, the circuit controller 406 may perform the method 500 or operations of the method to control any charge circuit components to shape or otherwise alter a charge signal to a battery 404. The operations may be performed by one or more hardware components of the circuit controller 406, one or more programs of the controller, or a combination of both hardware and software components of the circuit controller.

Beginning in operation 502, the circuit controller 406 may determine a target shape of a charge signal for charging a battery 404. As described above, the target shape for the charge signal may be based on characteristics of the battery 404 under charge, such as a measured impedance (including real and imaginary components), a state of charge, a battery temperature, a modeled ideal battery, etc. The shape of the charge signal may be any arbitrary shape, which may be formed by one or more specific harmonics. The charge signal may extend for some period of time and may temporarily drop to a zero or negative level before returning to a positive value. In various examples, the target shape of the charge signal may be generated by the signal shaping generator 410 of the circuit controller 406 based on a charge signal algorithm or any other executable instructions to determine a target shape of a charge signal for optimal charging of the battery 404.

In operation 504, the target charge signal may be applied to or otherwise provided to a model 440 of the charge circuit 400. The circuit model 440 may include a model of any number of components of the charge circuit 400 or any other charge circuit. In one particular implementation, the circuit model 440 may comprise inductor 416 of the charge circuit 400. In another implementation, the circuit model 440 may include the components of filter circuit 324 of the charge circuit 300 of FIG. 3. Regardless of the components modeled, the circuit model 440 may receive the target charge signal and, through a simulation of the transistor control and resulting signal applied to the modeled inductor, generate or otherwise model the expected charge signal to be applied to the battery. Thus, in operation 506, the circuit controller 406 may receive the expected charge signal at the battery 404 of the modeled circuit. For example, the circuit model 440 may comprise the inductor 416 component of the charge circuit. A target charge signal may be input to the modeled inductor (such as through a modeled control of the switches 412, 414 to generate the target charge signal) and, based on a simulation of the target charge signal as the signal is transmitted through the modeled inductor, an expected charge signal at the output of the modeled inductor may be output by the circuit model 440. As the inductor 416 is directly connected to the battery 404, the expected charge signal may be the charge signal as applied to the battery 404 to charge the battery. For circuit models 440 that include other or different components, the effect on the charge signal by each component may be modeled and an output of the charge signal arriving at the battery 404 may be determined. Regardless of the number and configuration of components modeled in the circuit model 440, the output of the model indicates the effect the components may have on an input charge signal such that an estimated charge signal at the battery 404 may be determined.

The circuit controller 406 may, in operation 508, generate one or more control signals to components of the charge circuit 400 to generate a shaped charge signal based on the output of the circuit model 440. In one particular implementation, the circuit controller 406 may generate one or more control signals to the first switching device 412 and/or the second switching device 414 to account for the effect the charge circuit 400 components may have on the charge signal such that the charge signal applied to the battery 404 takes the shape as determined by the signal shaping generator 410 and/or the circuit model 440. For example, when a target charge signal shape is determined based on the output of the model, the circuit controller 406 may generate control signal 430 for first transistor 412 and/or control signal 432 for second transistor 414. In one instance, control signal 430 may be opposite control signal 432 such that the switching of transistors occurs in opposite states (e.g., an open first transistor occurs at the same time as a closed second transistor and vice versa). In general, however, any control signals for any number of components of the charge circuit 400 may be generated and transmitted to the components of the charge circuit to generate the shaped charge signal for charging the battery 404. Regardless of how the charge circuit in controlled, the control signals may be based on the circuit model 440 and a simulation of a target charge signal on the circuit model to estimate an expected charge signal at the battery 404. The use of the circuit model 440 may be utilized to improve the efficiency and speed at which the charge signal is shaped.

At operation 510, the circuit controller 406 may receive feedback data from battery measurement circuit 408, which feedback may be characteristics of the battery 404 in response to the shaped target charge signal. Such signals may include a current into the battery or a voltage across the battery, among others, in response to or in the presence of a charge signal at the battery, which may be the initial charge signal. The measurements may be provided to the signal shaping generator 410 which may, in turn, determine an error between an expected measurement of the battery characteristic and a measured value at the battery 404. Thus, at operation 512, the circuit controller 406 determine a difference, or "error", between expected measured values at the battery 404 from the shaped charge signal and the measured values at the battery. If the measured values at the battery 404 are not different than the expected values, the circuit controller 406 may return to operation 502 to repeat the above process. However, if the feedback indicates that the measured aspects at the battery 404 due to the shaped charge signal is different than an expected value as output by the circuit model 440, the one or more controls of the components of the circuit 400 may be adjusted based on the determined error. In some instances, one or more aspects of the circuit model 440 itself may be adjusted based on the feedback information. In this manner, components of the circuit controller 406 may be altered or adjusted in response to the feedback received from the battery measurement circuit 408.

Through the circuits and methods described herein, a prediction of a charge signal at the battery 404 may be generated and the transistors 412, 414 may be controlled accordingly. As described above, transistors 412, 414 are typically controlled through a fast-changing PWM signal. However, through the circuit model 440, the control of the transistors 412, 414 may not be synchronized to an external clock but may, instead, appear as a random digital signal at the gate of the transistors 412, 414. Several advantages are gained through the use of the circuit model 440 in the circuit controller 406, including but not limited to, simplicity of design, difficulty in reverse-engineering as the control signals appear as random digital signals, and increased accuracy in charge signal shaping. In particular, the switching of the transistors 412, 414 may be controlled in increments of 10 ns or less, much faster than circuits that use feedback measurements to adjust the shape of the charge signal. This allows for very small adjustments in output current. Further, the circuit model 440 may track minimum on and off times for the transistors 412, 414 and incorporate that tracking into control of the transistors, reducing switching losses and overall stability of the transistors.

Further still, the charging circuits and methods described herein may apply to a battery 404 comprising a single cell or multiples. In a multiple cell configuration, the cells may be arranged in a series configuration, a parallel configuration, or a combination of series and parallel configurations. Multiple batteries arranged in a series configuration may reduce the overall current used to charge the batteries as the current is divided among batteries in the series connection. By connecting the batteries in series, the charging circuit 400 may require less current, further improving the efficiency of the charging circuit.

Figure 6:
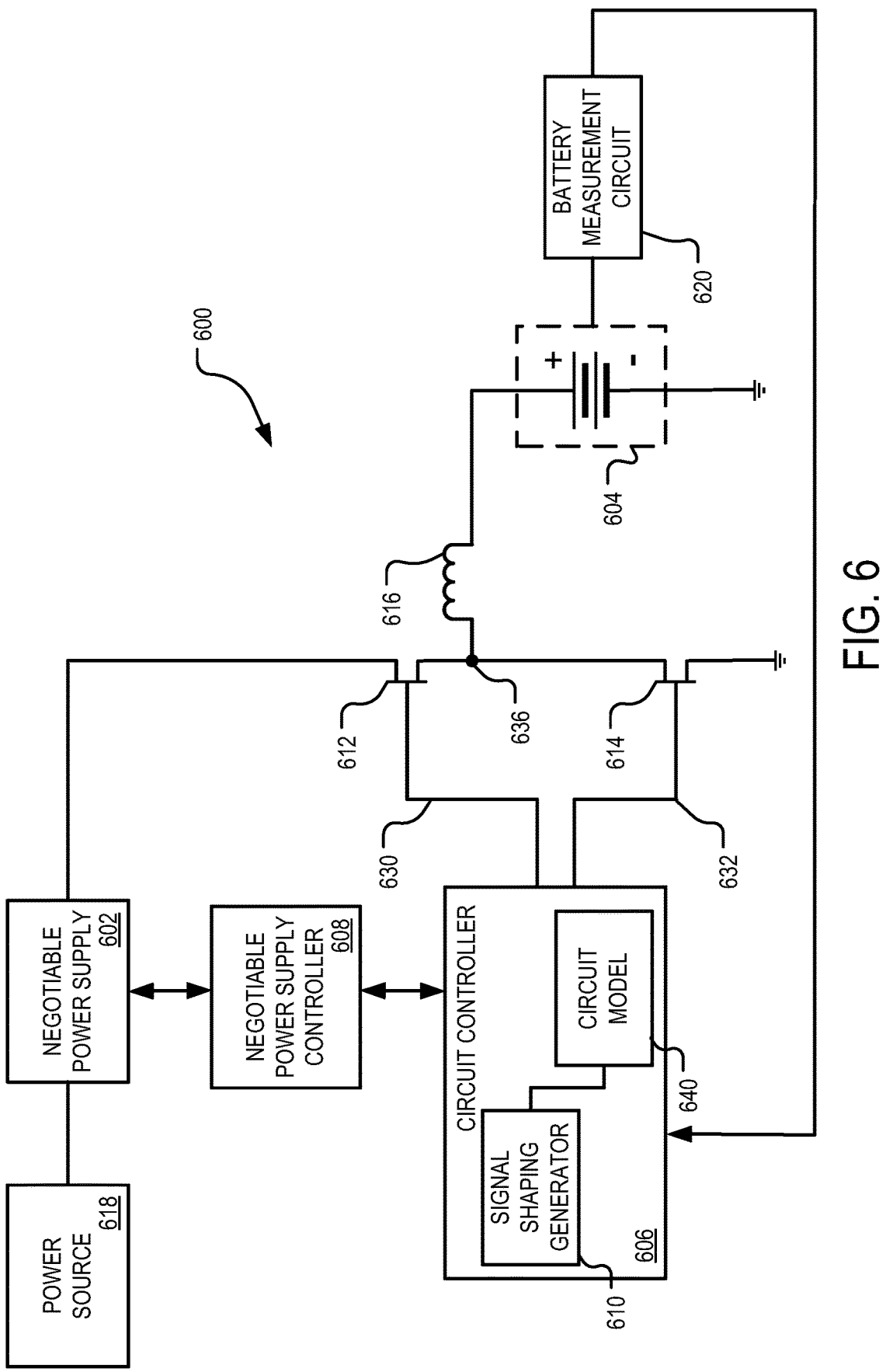
FIG. 6 is a schematic diagram illustrating a circuit for charging a battery utilizing a circuit model and a negotiable power supply in accordance with one embodiment.

In some instances, the power supply of the battery charge circuit discussed above may include a negotiable power supply in which the supplied power signal (e.g., voltage and/or current signals that comprise the power signal) may be negotiated or otherwise selected by one or more components of the charge circuit such that the power signal may vary from charge to charge. FIG. 6 is a schematic diagram illustrating a circuit 600 for charging a battery 604 utilizing a circuit model 640 and a negotiable power supply 602 in accordance with one embodiment. The charge circuit 600 of FIG. 6 may include similar components and operate in a similar manner as the charge circuit 400 discussed above with reference to FIG. 4. For example, the circuit 600 may include a circuit controller 606 that includes a circuit model 640 to estimate the charge signal at the output of an inductor 616 for application to a current collector of the battery 604. The circuit 600 may also include a first transistor 612, a second transistor 614, and an inductor 616 that operate as described above to alter or shape a charge signal to charge the battery 604. The circuit 600 may also, in some instances, include a battery measurement circuit 620 to provide feedback to the circuit controller 606. The shaping of the charge signal may be based, in some instances, on instructions generated and/or transmitted by a signal shaping generator 610 to the first transistor 612 (over transmission line 630) and/or the second transistor 614 (over transmission line 632). The circuit 600 illustrated in FIG. 6 is a simplified version of a charge circuit and many components of the charge circuit have been removed for clarity.

The charge circuit 600 may also include a negotiable power supply 602 for providing a power signal to one or more components of the charge circuit, such as first transistor 612. In general, a negotiable power supply 602 is an interface through which a particular power signal may be requested, negotiated, or otherwise selected by a component of the charge circuit 600. More particularly, one or more aspects or components of the power signal may be negotiated, such as a voltage component and/or a maximum current component of the power signal. One example of a negotiable power supply 602 is a USB-C supply. The negotiable power supply 602 may interface the charge circuit 600 with a power source 618. The power source may be any power source, including but not limited to, a wall outlet, a charge block, a laptop computer, a battery, or any other source of a power signal. The amount of power available from the power source 618 may vary based on the type of power source. For example, a laptop computer may provide less charging power than a wall outlet. As such, the negotiable power supply 602 may provide an interface between the power source 618 and the circuit 600 that provides for different power signals that may be provided by the power source depending on the type of power source used. In the USB-C example above, the negotiable power supply 602 may include a USB-C connector that may interface with a wall outlet adapter or a USB-C port in a laptop or other computing device with a battery from which power may be provided to the circuit 600. In this manner, the negotiable power supply 602 may provide an interface to different power sources 618 providing different power signals for charging the battery 604.

The negotiable power supply 602 may include one or more communication lines to communicate one or more available power signals from the power source 618 for powering the circuit 600 and/or charging the battery 604. For example, in circumstances in which the power source 618 is a wall outlet, the negotiable power supply 602 may indicate, over the communication lines, the availability of 120 volts and/or 15 amps of power signal components. In general, different power sources 618 may provide different available voltages and/or currents which may be detected by the negotiable power supply 602. To communicate with the negotiable power supply 602, one or more components of charge circuit 600 may connect to and communicate with the negotiable power supply over the communication lines. For example, the circuit 600 may include a negotiable power supply controller 608 connected to the negotiable power supply 602 for negotiating or otherwise communicating with the negotiable power supply. Although illustrated as separate from the circuit controller 606, the negotiable power supply controller 608 may be included with or embodied within the circuit controller, in some implementations.

Figure 7:
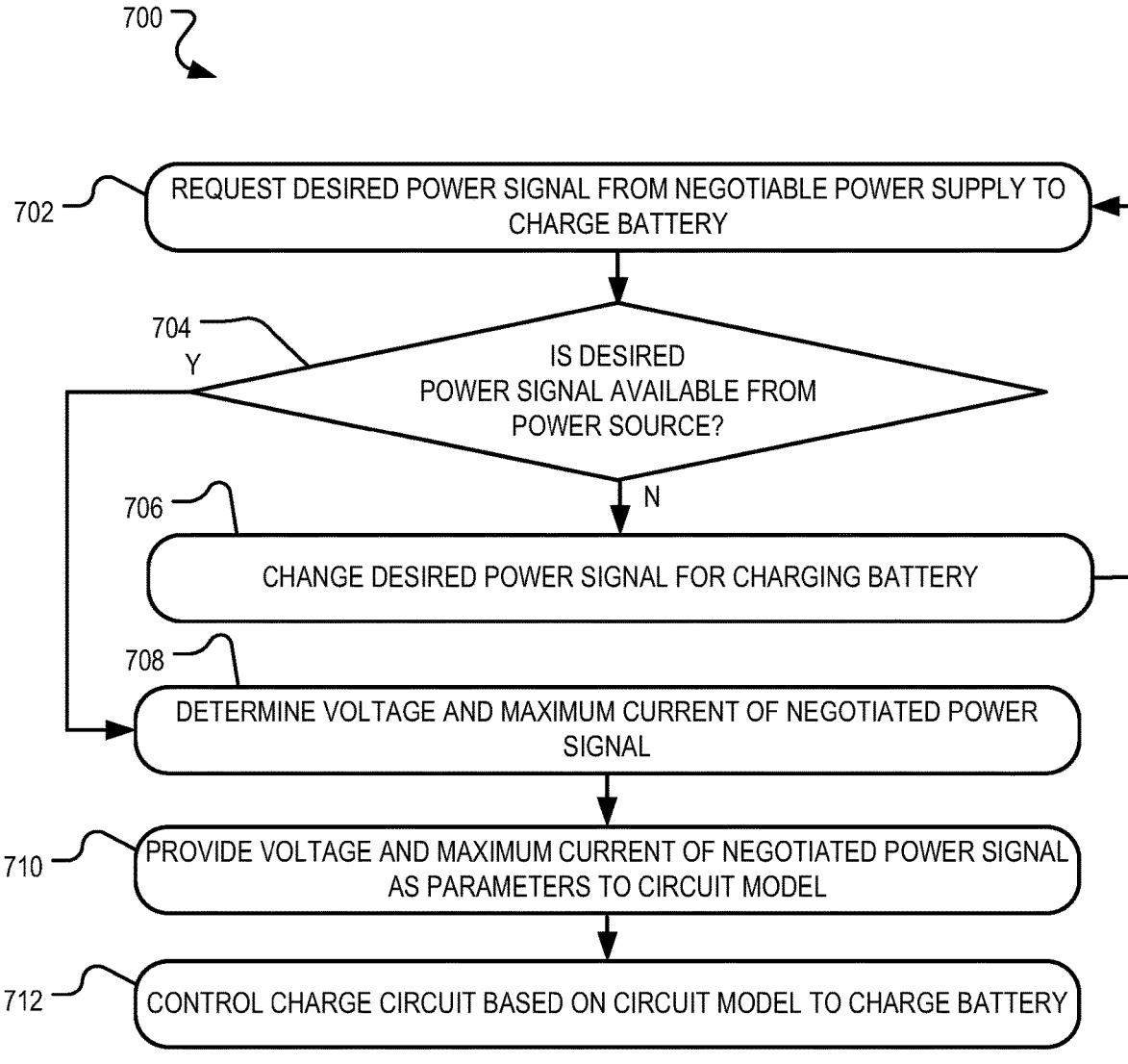
FIG. 7 is a flowchart illustrating a method for utilizing a negotiable power supply and a circuit model to charge a battery in accordance with one embodiment.

The power signal information negotiated between the negotiable power supply 602 and the negotiable power supply controller 608 may be used by the circuit controller 606 or other components of the charge circuit 600 to charge the battery 604. For example, FIG. 7 is a flowchart illustrating a method 700 for utilizing a negotiable power supply 602 and a circuit model 640 to charge a battery 604 in accordance with one embodiment. In some implementations, the operations of the method 700 may be performed or executed by the negotiable power supply controller 608 and/or the circuit controller 606, as discussed in more detail below. However, other components of the charge circuit 600 or computing devices not shown in FIG. 6 may perform one or more of the operations. Further, the operations may be performed through execution of a software program or instruction, through one or more hardware components of the charge circuit 600, or through a combination of software and hardware components.

Beginning in operation 702, the negotiable power supply controller 608 may request a desired power signal from the negotiable power supply 602 for use in charging the battery 604. For example, the negotiable power supply controller 608 may transmit a request over one or more communication lines to the negotiable power supply 602 requesting a level of a power signal, such as 50 W power signal. The negotiable power supply 602, as mentioned above, may communicate with the power source 618 or may receive a power signal from the power source and, from the communication or the power signal, determine one or more available power signals for providing to the charge circuit 600. In many instances, the negotiable power supply 602 may transform an alternating current (AC) power signal from the power source 618 to a direct current (DC) power signal. The negotiable power supply 602 may also step down the power signal to a lower power level, such as receiving a 1800 W signal from a wall outlet to a 100 W signal. In other instances, the negotiable power supply 602 may step down some components of the power signal from the power source 618 while retaining other components, such as stepping down a voltage component while maintaining the current component of the power signal.

In response to the requested power signal, the negotiable power supply 602 may communicate with the negotiable power supply controller 608 over the one or more communication lines to indicate if the desired power signal is available from the negotiable power supply. For example, the negotiable power supply controller 608 may request a 50 W power signal, as described above. However, the power source 618 may be limited to a 30 W power signal such that the negotiable power supply 602 may indicate that a 50 W power signal is not available to charge the battery 604. Thus, the negotiable power supply controller 608 may determine, in operation 704, if the desired power signal is available from the negotiable power supply 602 and, if not, may change the desired power signal in operation 706. In some implementations, the negotiable power supply 602 may provide an indication of one or more power signals available based on the power source 618 from which the negotiable power supply controller 608 may select. In other implementations, the negotiable power supply controller 608 may be programmed with various desired power signals for charging the battery 604 and may select an alternate desired power signal from the preset desired power signals.

In still other implementations, the desired power signal may be provided by the circuit controller 606 to the negotiable power supply controller 608. More particularly, the negotiable power supply controller 608 may be in communication with the circuit controller 606 and may receive one or more desired power signals from the circuit controller. The circuit controller 606 may determine the desired power signal based many factors and/or operation of the charge circuit 600. For example, the desired power signal may be based on one or more measured characteristics of the battery 604, as discussed above. In another example, the desired power signal may be based on a target power signal used as an input to the circuit model 640. Regardless, the negotiable power supply controller 608 may return to operation 702 to request the changed desired power signal from the negotiable power supply 602. The negotiable power supply controller 608 may continue requesting and altering a desired power signal from the negotiable power supply 602 until an available power signal is selected by the negotiable power supply controller.

Upon negotiating a power signal from the negotiable power supply 602, the negotiable power supply controller 608 or the circuit controller 606 may determine a voltage and/or maximum current of the negotiated power signal in operation 708. For example, the negotiable power supply controller 608 or circuit controller 606 may receive the power signal from the negotiable power supply 602 and measure a voltage of the signal and a maximum current of the signal. The measurements may then be transferred to the circuit controller 606 in some implementations. In another example, the negotiable power supply 602 may determine provide characteristics of the power signal to the negotiable power supply controller 608, such as the voltage and maximum current of the negotiated power signal. The characteristics may be received by the negotiable power supply controller 608 and provided to the circuit controller 606.

In operation 710, the circuit controller 606 may provide the negotiated power signal characteristics, such as the voltage and maximum current, to the circuit model 740 for use in controlling the switches 612, 614 of the circuit 600, as discussed above. In particular, the circuit model 640 may utilize the voltage of the negotiated power signal to determine a frequency of the control signals transmitted to the switching devices 612, 614 of the charge circuit 600. The transmission of the power signal through the switches 612, 614 may be dependent upon the voltage of the power signal provided by the negotiable power supply 602 such that the frequency the pulsed control signal to switch 612 may be based on the voltage of the power signal. In another example, the circuit model 640 may maintain an amount of current pulled from a power source used to charge the battery 604 to ensure that the charge signal does not overwhelm the battery or pulls too much current to damage the power source 618. In particular, the charge circuit 600 may be configured to apply a 100 W power signal to charge the battery 604, although the negotiated power signal may only be 30 W. If control of the charge circuit 600 is not adjusted to the negotiated power signal, the circuit may attempt to pull more current (100 W) from the power source 618 than is available (30 W), degrading the performance or damaging the power source. In general, the circuit model 640 may receive any characteristic of the negotiated power signal as an input or parameter to the circuit model to improve the accuracy of the model. As the model 640 is configured to estimate the charge signal applied to the battery 604 based on an input power signal to the first switch 612, characteristics and parameters of the negotiated power signal may aid the model in providing a more accurate estimate charge signal.

In operation 712, the circuit controller 606 may control the charge circuit 600 to shape a charge signal based on the negotiated power signal characteristics or parameters as discussed above. In particular, the circuit model 640 may receive the characteristics of the negotiated power signal as input parameters such that the model may determine or calculated an input power signal to the modeled circuit. As described above, the circuit model 640 may model one or more components of the charge circuit to process an input power signal to an estimated output power signal. In this manner, the input power signal for the circuit model 640 may drive the output of the circuit model and influence the estimated output power signal to the battery 604. The estimated output power signal from the circuit model 640 may be used as described above to determine the control of the components of the charge circuit 600 by the circuit controller 606. In this manner, the charge circuit may generate an initial shaped charge signal without feedback from the battery 604 and may utilize a negotiated power supply 602 to provide the input power signal to the charge circuit.

Figure 8:
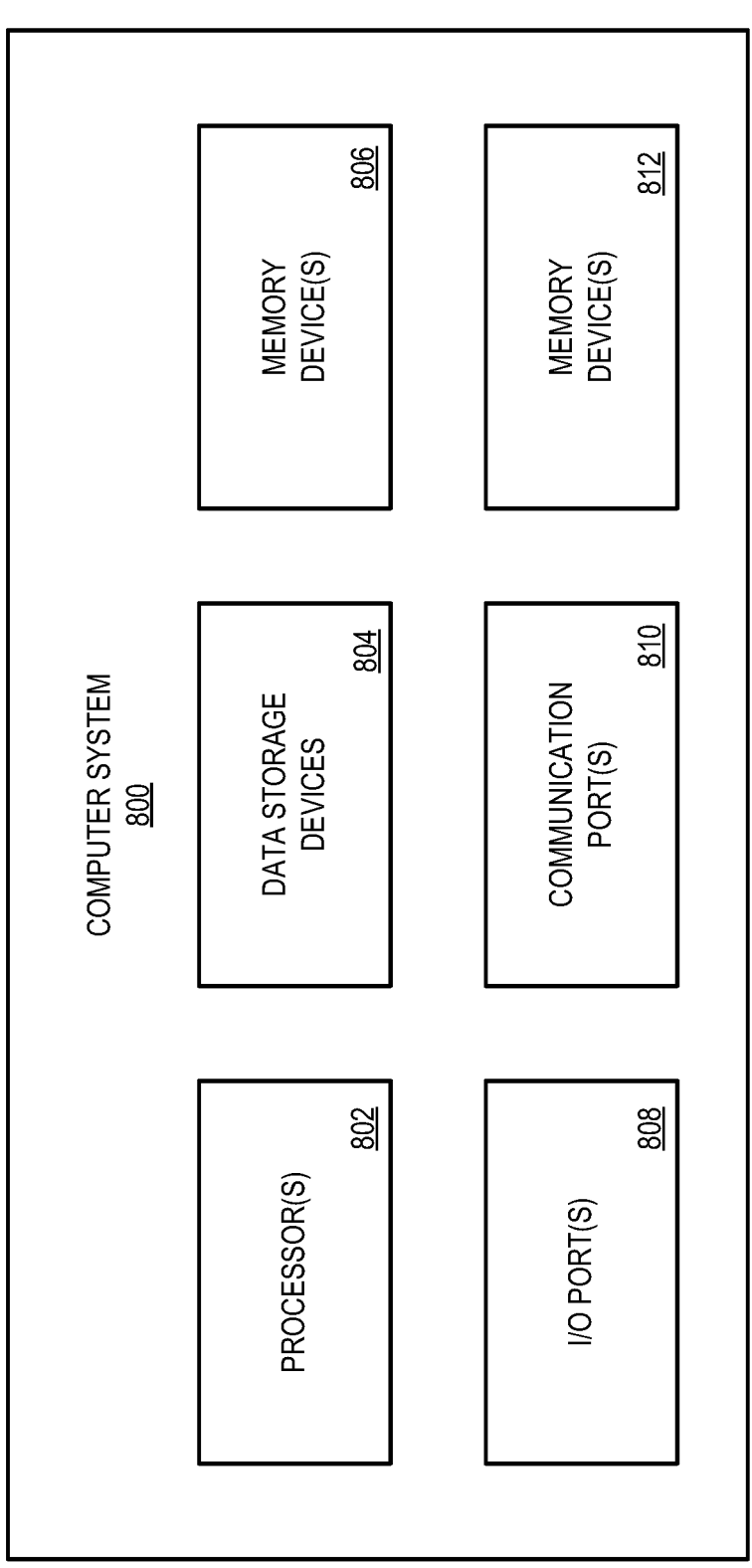
FIG. 8 is a diagram illustrating an example of a computing system which may be used in implementing embodiments of the present disclosure.

Referring to FIG. 8, a detailed description of an example computing system 800 having one or more computing units that may implement various systems and methods discussed herein is provided. The computing system 800 may be part of a controller, may be in operable communication with various implementation discussed herein, may run various operations related to the method discussed herein, may run offline to process various data for characterizing a battery, and may be part of overall systems discussed herein. The computing system 800 may process various signals discussed herein and/or may provide various signals discussed herein. For example, battery measurement information may be provided to such a computing system 800. The computing system 800 may also be applicable to, for example, the controller, the model, the tuning/shaping circuits discussed with respect to the various figures and may be used to implement the various methods described herein. It will be appreciated that specific implementations of these devices may be of differing possible specific computing architectures, not all of which are specifically discussed herein but will be understood by those of ordinary skill in the art. It will further be appreciated that the computer system may be considered and/or include an ASIC, FPGA, Microcontroller, or other computing arrangement. In such various possible implementations, more or fewer components discussed below may be included, interconnections and other changes made, as will be understood by those of ordinary skill in the art.

The computer system 800 may be a computing system that is capable of executing a computer program product to execute a computer process. Data and program files may be input to the computer system 800, which reads the files and executes the programs therein. Some of the elements of the computer system 800 are shown in FIG. 8, including one or more hardware processors 802, one or more data storage devices 804, one or more memory devices 806, and/or one or more ports 808-812. Additionally, other elements that will be recognized by those skilled in the art may be included in the computing system 800 but are not explicitly depicted in FIG. 8 or discussed further herein. Various elements of the computer system 800 may communicate with one another by way of one or more communication buses, point-to-point communication paths, or other communication means not explicitly depicted in FIG. 8.

The processor 802 may include, for example, a central processing unit (CPU), a microprocessor, a microcontroller, a digital signal processor (DSP), and/or one or more internal levels of cache. There may be one or more processors 802, such that the processor 802 comprises a single central-processing unit, or a plurality of processing units capable of executing instructions and performing operations in parallel with each other, commonly referred to as a parallel processing environment.

The presently described technology in various possible combinations may be implemented, at least in part, in software stored on the data stored device(s) 804, stored on the memory device(s) 806, and/or communicated via one or more of the ports 808-812, thereby transforming the computer system 800 in FIG. 8 to a special purpose machine for implementing the operations described herein. Examples of the computer system 800 includes or may be implemented in vehicles of various possible types ranging from scooters and bicycles to cars, power tools, various possible mobile communication/computing environment including mobile phones, tablets, and laptops, personal computers, multimedia consoles, gaming consoles, set top boxes, embedded computing and processing systems, and the like.

The one or more data storage devices 804 may include any non-transitory data storage device capable of storing data generated or employed within the computing system 800, such as computer executable instructions for performing a computer process, which may include instructions of both application programs and an operating system (OS) that manages the various components of the computing system 800. The data storage devices 804 may include, without limitation, magnetic disk drives, optical disk drives, solid state drives (SSDs), flash drives, and the like. The data storage devices 804 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 806 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 804 and/or the memory devices 806, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 800 includes one or more ports, such as an input/output (I/O) port 808, a communication port 810, and a sub-systems port 812, for communicating with other computing, network, or vehicle devices. It will be appreciated that the ports 808-812 may be combined or separate and that more or fewer ports may be included in the computer system 800. The I/O port 808 may be connected to an I/O device, or other device, by which information is input to or output from the computing system 800. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 800 via the I/O port 808. In some examples, such inputs may be distinct from the various system and method discussed with regard to the preceding figures. Similarly, the output devices may convert electrical signals received from computing system 800 via the I/O port 808 into signals that may be sensed or used by the various methods and system discussed herein. The input device may be an alphanumeric input device, including alphanumeric and other keys for communicating information and/or command selections to the processor 802 via the I/O port 808. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 800 via the I/O port 808. For example, an electrical signal generated within the computing system 800 may be converted to another type of signal, and/or vice-versa. In one implementation, the environment transducer devices sense characteristics or aspects of an environment local to or remote from the computing device 800, such as battery voltage, open circuit battery voltage, chare current, battery temperature, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 800, such as, physical movement of some object (e.g., a mechanical actuator), heating or cooling of a substance, adding a chemical substance, and/or the like.

In one implementation, a communication port 810 may be connected to a network by way of which the computer system 800 may receive network data useful in executing the methods and systems set out herein as well as transmitting information and network configuration changes determined thereby. For example, charging protocols may be updated, battery measurement or calculation data shared with external system, and the like. The communication port 810 connects the computer system 800 to one or more communication interface devices configured to transmit and/or receive information between the computing system 800 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 810 to communicate with one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 810 may communicate with an antenna for electromagnetic signal transmission and/or reception. In some examples, an antenna may be employed to receive Global Positioning System (GPS) data to facilitate determination of a location of a machine, vehicle, or another device.

The computer system 800 may include a sub-systems port 812 for communicating with one or more systems related to a device being charged according to the methods and system described herein to control an operation of the same and/or exchange information between the computer system 800 and one or more sub-systems of the device. Examples of such sub-systems of a vehicle, include, without limitation, motor controllers and systems, battery control systems, and others.

The system set forth in FIG. 8 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

We claim:

1. A method of charging an electrochemical device comprising:

providing at least one characteristic of a negotiated power signal as an input parameter to a model of a charging circuit;

inputting a target charge waveform to the model of the charging circuit to determine an estimated charge waveform generated by the charging circuit, the estimated charge waveform based on the at least one characteristic of the negotiated power signal and the target charge waveform; and controlling, based on the estimated charge waveform, a switching device of the charging circuit.

2. The method of claim 1 further comprising:

communicating with a negotiable power supply to request the negotiated power signal from the negotiable power supply.

3. The method of claim 2, wherein the negotiable power supply comprises a Universal Serial Bus, Type C (USB-C) connector in electrical communication with a power source.

4. The method of claim 3, wherein the power source is at least one of a wall outlet, a charge block, or a laptop computer.

5. The method of claim 1, wherein the at least one characteristic is a voltage value of the negotiated power signal and controlling the switching device comprises gen-erating a pulsed control signal to the switching device based on the voltage value of the negotiated power signal.

6. The method of claim 1, wherein the at least one characteristic is a maximum current value of the negotiated power signal and controlling the switching device comprises limiting an amount of power through the switching device based on the maximum current value of the negotiated power signal.

7. The method of claim 1 wherein the charging circuit comprises an inductor and the model of the charging circuit comprises a modeled inductor device.

8. The method of claim 7 wherein the inductor shapes a charge signal based on a controlled pulse signal at an input of the inductor.

9. The method of claim 1 wherein the switching device of the charging circuit comprises a transistor coupled to a power supply and control of the transistor provides an adjusted charge waveform.

10. The method of claim 1 wherein controlling the switching device comprises generating a non-uniform, digital signal as input to the switching device.

11. The method of claim 1 wherein the target charge waveform comprises a harmonic associated with an operational characteristic of the electrochemical device.

12. The method of claim 1 wherein the target charge waveform includes a harmonically shaped leading edge wherein the harmonically shaped leading edge corresponds to a harmonic and an impedance effect of the harmonic on a battery when charging.

13. The method of claim 1, further comprising:

receiving a battery characteristic feedback information from a battery measurement circuit; and altering, based on the feedback information, a parameter of the model of the charging circuit.

14. A system for charging an electrochemical device comprising:

a negotiable power supply controller in communication with a negotiable power supply; and a controller to:

receive, from the negotiable power supply controller, at least one characteristic of a negotiated power signal as an input parameter to a model of a charging circuit;

input a target charge waveform to the model of the charging circuit to determine an estimated charge waveform generated by the charging circuit, the estimated charge waveform based on the at least one characteristic of the negotiated power signal and the target charge waveform; and control, based on the estimated charge waveform, a switching device of the charging circuit.

15. The system of claim 14, wherein the negotiable power supply controller communicates with the negotiable power supply to request the negotiated power signal from the negotiable power supply.

16. The system of claim 14, wherein the negotiable power supply comprises a Universal Serial Bus, Type C (USB-C) connector in electrical communication with a power source.

17. The system of claim 16, wherein the power source is at least one of a wall outlet, a charge block, or a laptop computer.

18. The system of claim 14, wherein the at least one characteristic is a maximum current value of the negotiated power signal, the controller controlling the switching device to limit an amount of power through the switching device based on the maximum current value of the negotiated power signal.

19. The system of claim 14 wherein the switching device of the charging circuit comprises a transistor coupled to a power supply and control of the transistor provides an adjusted charge waveform.

20. The system of claim 14 wherein the controller further generates a non-uniform, digital signal as input to the switching device.

21. The system of claim 14 wherein the target charge waveform comprises a harmonic associated with an operational characteristic of the electrochemical device.

22. A method of charging an electrochemical device comprising inputting characteristics of a charge signal from a negotiated power supply to a model of a charge circuit, the model of the charge circuit defining a shaped charge signal for charging the electrochemical device based on the characteristics of the charge signal from the negotiated power supply.

23. The method of claim 22 wherein the model of the charge circuit comprises an inductor device that shapes the charge signal based on a controlled pulse signal at an input of the inductor device.

\*  \*  \*  \*  \*